(12) United States Patent
Fenton

(10) Patent No.: US 6,604,644 B1
(45) Date of Patent: Aug. 12, 2003

(54) FILLER ELEMENT FOR A TANK

(76) Inventor: Ronald L. Fenton, 1749 Golf Rd., Mt. Prospect, IL (US) 60056

( * ) Notice: Subject to any disclaimer, the term of this patent is extended or adjusted under 35 U.S.C. 154(b) by 190 days.

(21) Appl. No.: 09/689,919

(22) Filed: Oct. 13, 2000

Related U.S. Application Data

(63) Continuation-in-part of application No. 09/318,277, filed on May 25, 1999, now abandoned.

(51) Int. Cl.[7] .......................... B65D 81/00; B65D 25/02
(52) U.S. Cl. ........................................ 220/88.1; 29/428
(58) Field of Search .................. 428/595, 603, 428/594, 124, 596; 220/88.1, 88.2, 86.1; 206/0.6; 261/94, DIG. 72; 245/10; 140/71 R; 169/45, 62; 29/428

(56) References Cited

U.S. PATENT DOCUMENTS

| 2,231,828 | A | * | 2/1941 | Kerr ............................ 196/139 |
| 2,239,868 | A | * | 4/1941 | Williams ..................... 210/130 |
| 2,433,695 | A | * | 12/1947 | Hoffman ....................... 15/197 |
| 3,356,256 | A | | 12/1967 | Szego |
| 4,149,649 | A | | 4/1979 | Szego |
| 4,184,946 | A | * | 1/1980 | Kato .......................... 210/615 |
| 4,566,589 | A | | 1/1986 | Poschinger |
| 4,613,054 | A | | 9/1986 | Schrenk |
| 4,921,118 | A | | 5/1990 | Gass |
| 4,927,045 | A | | 5/1990 | Lichka |
| 4,988,011 | A | | 1/1991 | Fenton et al. |
| 5,000,236 | A | | 3/1991 | Jemison |
| 5,000,336 | A | | 3/1991 | Gass |
| 5,163,573 | A | | 11/1992 | Kang |
| 5,305,941 | A | * | 4/1994 | Kent et al. .................... 228/19 |
| 5,576,511 | A | | 11/1996 | Alhamad |
| 5,849,054 | A | * | 12/1998 | Fujisawa ..................... 280/740 |
| 6,062,316 | A | * | 5/2000 | Alhamad ..................... 169/45 |
| 6,105,676 | A | | 8/2000 | Alhamad |

* cited by examiner

Primary Examiner—John J. Zimmerman
(74) Attorney, Agent, or Firm—Douglas B. White

(57) ABSTRACT

Filler elements for a tank of combustible fluid described herein are formed from a sheet of foil mesh material by a multiple fold technique. The folding process places the free edges of the sheet in the center of the filler element where they are protected and where any piece that breaks off will be trapped. The sides are first folded inwardly and then the ends are folded inwardly. Finally, this intermediate member is rolled, formed, molded or folded further into the final desired shape for the filler element. Folding is facilitated by use of a crushed crease along desired fold lines. To reduce nesting of the mesh, various sections of the mesh corresponding to the fold lines present openings of differing sizes.

21 Claims, 5 Drawing Sheets

FILLER ELEMENT FOR A TANK

CROSS REFERENCE TO RELATED APPLICATIONS

This application is a continuation-in-part of U.S. application Ser. No. 09/318,277 filed May 25, 1999, now abandoned.

BACKGROUND OF THE INVENTION

1. Field of the Invention

The present invention relates generally to receptacles for combustible materials, such as fuel tanks. More particularly, this invention relates to an improvement in the filler mass inserted in such tanks to prevent explosion. Specifically, this invention relates to the design of discreet filler elements which are used to fill a tank and which have folded in portions to prevent flaking of exposed end edges of layers of metal foil sheet material from which the filler mass is formed.

2. Description of the Prior Art

It is well known in the prior art that a filler mass insert for a tank may be formed from a metal foil mesh and will act to prevent explosion by transmitting heat from hot spots occurring on the tank exterior. This filler mass is traditionally formed of multiple layers of an expanded metal foil (U.S. Pat. No. 3,356,256), the method of manufacture thereof being well established in the art (U.S. Pat. No. 4,921,118). The resulting multi-layer mass can be either rolled into a coil, cut into pieces and stacked, or fan-folded (U.S. Pat. No. 4,149,649) to yield a filler mass of the size and shape of the cylindrical or rectangular tank to be fitted (U.S. Pat. No. 4,566,589).

More recently, various filler mass elements have been formed from foil material in order to retro-fit existing tanks and to accommodate tanks of irregular shape. These designs have not been entirely successful for a variety of reasons; but most importantly, because they all exhibit free edges which break off during use and then clog fuel lines (typically referred to as "flaking"). As an example, in U.S. Pat. No. 4,613,054 a spherical shaped filler element is disclosed. This filler element begins as a continuous sheet of mesh, is rolled into a cylinder, severed from the sheet, and finally crushed into a ball shape. It can readily be seen that this process creates a discreet, compacted filler element that, as a result of the construction process, will allow the mesh layers to "nest" and will leave exposed free edges on the exterior of the sphere. Moreover, the final crushing step compacts this filler element, reducing the available open interior space and thereby reducing its effectiveness as a filler mass. Similarly, in U.S. Pat. No. 5,000,336 another design for cylindrical and spherical discreet filler elements is presented. A strip of foil mesh having holes of irregular size is rolled into a cylindrical filler element and compressed into a sphere. By using holes of irregular size in the mesh, nesting of the mesh layers is reduced, but the problem of "flaking" from exposed edges is not resolved.

In U.S. Pat. No. 4,927,045 a different filler mass element is proposed which is described as having a long supporting member with a multitude of projecting plates. This element is used to retro-fit tanks with a filler mass by inserting the element through the tank opening; but the extensive number of free edges radiating from the supporting member in this design increases the "flaking" problem many fold, thereby preventing its use in any application where a clogged fuel line would pose an unacceptable risk.

Disclosures of previously proposed analogous and explosion proof containers are set forth in the following analogous and non-analogous U.S. Patents listed below.

| U.S. Pat. No. | Patentee |
| --- | --- |
| 3,356,256 | Szego |
| 4,149,649 | Szego |
| 4,566,589 | Porschinger |
| 4,613,054 | Schrenk |
| 4,988,011 | Fenton, et al. |
| 4,921,118 | Gass |
| 4,927,045 | Lichka |
| 5,000,236 | Jemison |
| 5,000,336 | Gass |
| 5,163,573 | Kang |
| 5,576,511 | Alhamad |
| 6,105,676 | Alhamad |

SUMMARY OF THE INVENTION

It is a principal objective of this invention to provide a design for a discreet filler element which will eliminate the "nesting" and "flaking" problems inherent in the prior art.

It is a further objective to present such a design for a filler element which can be easily formed into a variety of shapes with minimal crushing to preserve the effectiveness of the filler mass.

The filler elements of the present invention are formed from a sheet of foil mesh material, or the like by a multiple fold technique. The folding process places the peripheral free edges of the sheet near the center of the filler element where the edges are protected and where any piece that should break off will be trapped.

For a rectangular sheet, the opposing sides are first folded inwardly along a crushed crease and then the opposing ends are similarly folded inwardly along a crushed crease. This creates an intermediate folded member which can then be rolled, molded, formed or folded again into a final desired shape for the filler element.

To eliminate nesting of the mesh within the filler element, various sections of the mesh corresponding to the folds are arranged to present openings of varying sizes, such that, when folded, sections of differing sized openings are juxtaposed.

According to the present invention there is provided a filler element for a tank comprising: a packet formed from at least one sheet of foil mesh, said at least one sheet of foil mesh being folded over several times such that peripheral free edges of the sheet of foil mesh are folded inwardly and are disposed internally of the packet thus formed.

While the invention will be described in connection with a preferred embodiment, it will be understood that it is not the intent to limit the invention to that embodiment. On the contrary, it is the intent to cover all alternatives, modifications, and equivalents as may be included within the spirit and scope of the invention as defined by the appended claims.

DESCRIPTION OF THE PREFERRED EMBODIMENT(S)

Figure 1:
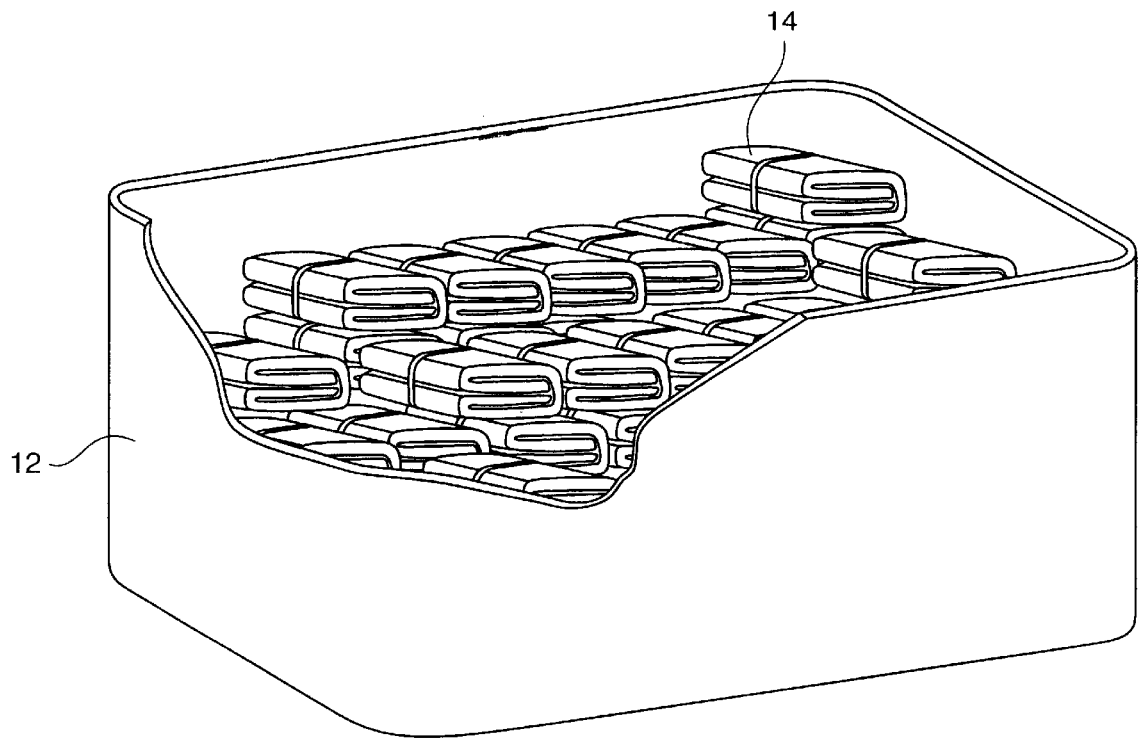
FIG. 1 is a perspective view of a tank filled with a plurality of filler mass elements in accordance with the present invention.

Turning first to FIG. 1, there is illustrated a tank 12 having a plurality of fuel permeable filler mass insert elements 14 stacked therein to form a thermal filler mass within the tank. While only a portion of the tank is shown here for clarity, in practice an entire closed tank with an access opening is used, as is well known in the art. Also, the entire tank is filled with the filler elements, such that they are in thermal contact with one another and with the tank walls. During manufacture of the tank, the insert elements may be stacked inside before the tank is closed, or alternatively, the filler elements may be manufactured in a size small enough to be inserted through an access opening of the tank after the tank is completed.

Figure 2:
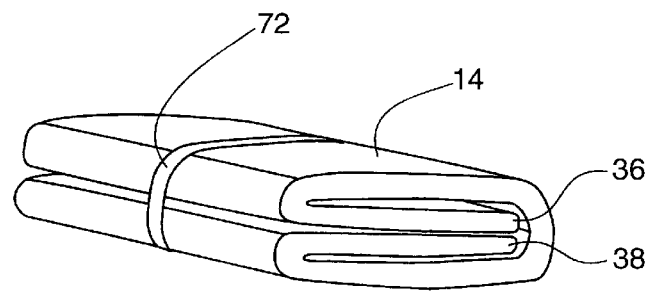
FIG. 2 is a perspective view of a filler mass element utilized in FIG. 1.
Figure 9:
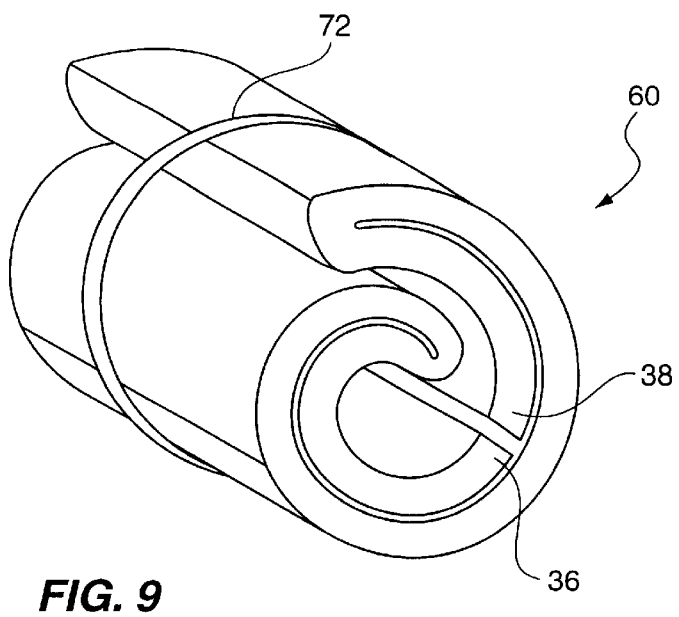
FIG. 9 is a perspective view of an alternate form of the filler mass element.
Figure 10:
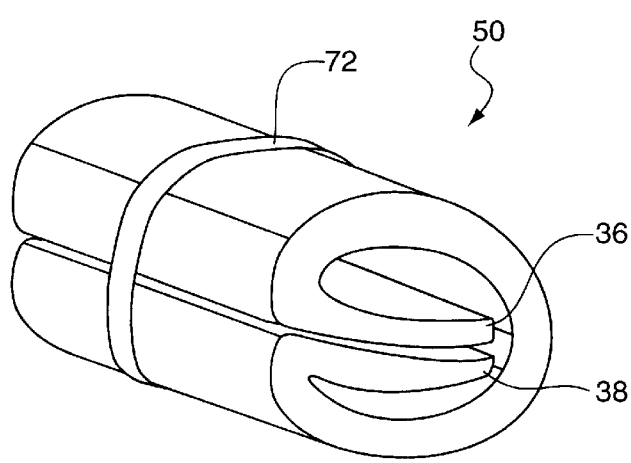
FIG. 10 is a perspective view of yet another alternate form of the filler mass element.

A filler element constructed in accordance with the teachings of the present invention, such as is depicted in FIGS. 2, 9 and 10, is formed from at least one sheet of expanded metallic foil mesh (see FIGS. 3 and 4), having longitudinal sections of large openings 24 and small openings 26 defined thereon, and having exposed free edges along its periphery. (While a rectangular sheet is shown, it should be readily apparent that any geometrical shape can be used to create an equivalent filler element in accordance with the teachings of this invention and that the expanded foil mesh described herein may be replaced by other perforated foil equivalents known in the art.)

In the preferred embodiment, the longitudinal sections of large openings 24 and small openings 26 correspond to the first fold lines used in the construction of the filler element thereby to juxtapose these differing sized openings in the completed filler element. As an alternative variation, the sizes of the mesh openings can be mixed within a particular longitudinal section or they can be randomly disposed across the section.

Figure 3:
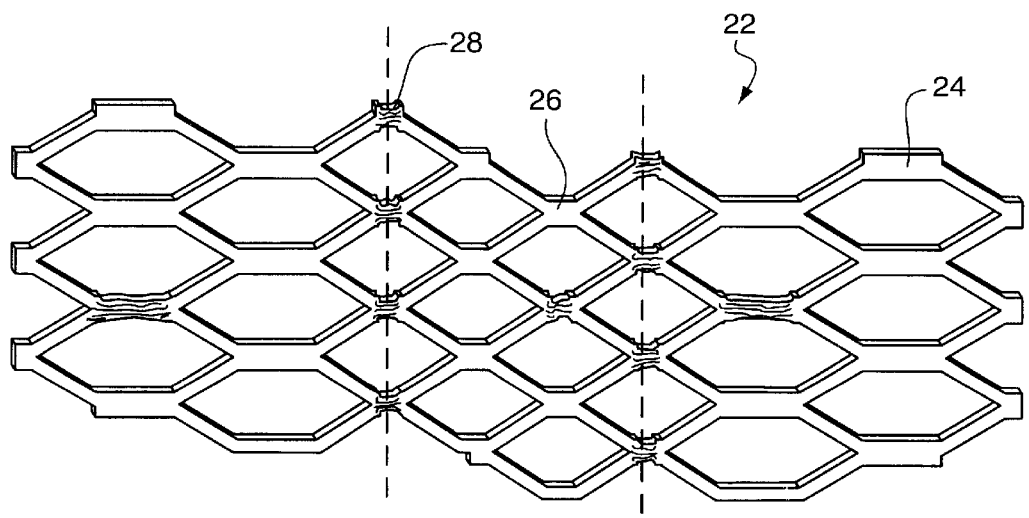
FIG. 3 is a perspective view of a portion of a sheet of expanded metallic foil mesh for use in forming the filler mass element.

A portion of a foil mesh sheet 22 for use in constructing the filler element is shown in detail in FIG. 3. Although it is possible to bend the foil sheet where folds are desired, preferably there is disposed near the boundary between longitudinal sections of differing hole sizes a crushed line 28 (shown as a dotted line). This crushed line functions as a crease along the desired fold line for facilitating the construction of the filler element.

Figure 4:
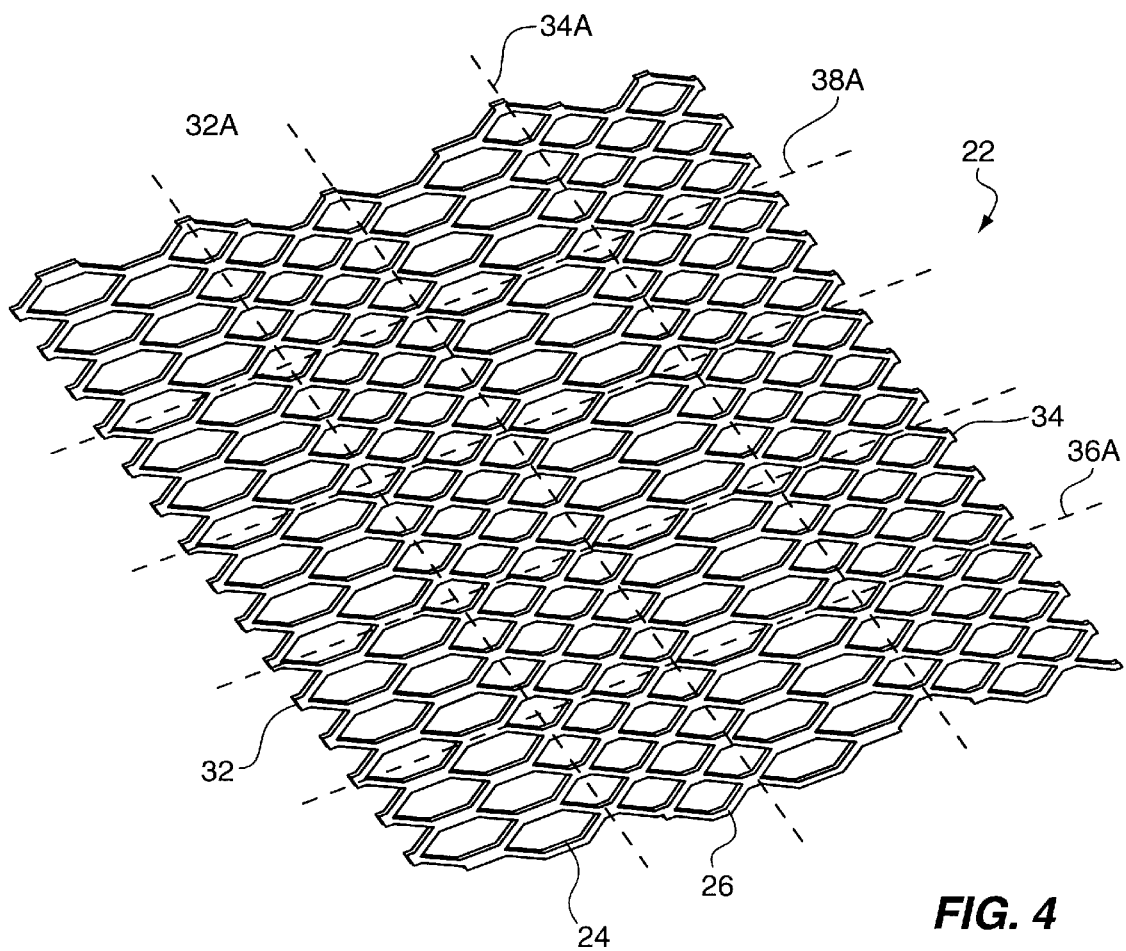
FIG. 4 is a perspective view of a rectangular sheet of metallic foil mesh for use in forming the filler mass element of FIG. 2.
Figure 5:
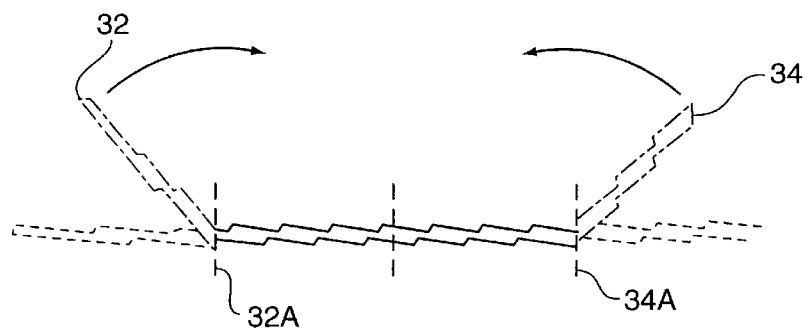
FIG. 5 is an end view of the sheet of FIG. 4 illustrating the first fold for the filler mass element.
Figure 6:
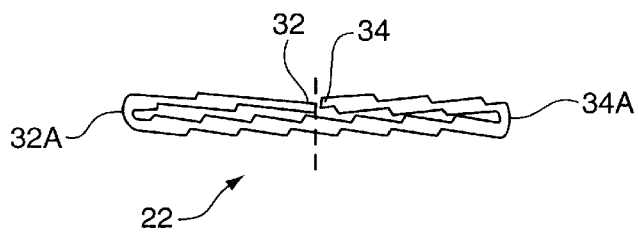
FIG. 6 is an end view of the sheet of FIG. 4 illustrating the completion of the fold of FIG. 5.

The beginning of the construction of the filler element is shown in FIGS. 4, 5 and 6, where first opposing side peripheral edges 32 and 34 are folded inwardly along crease lines 32a and 34a to a center line extending across a sheet of foil mesh material, respectively, to place these side free edges near the center of the sheet.

Figure 7:
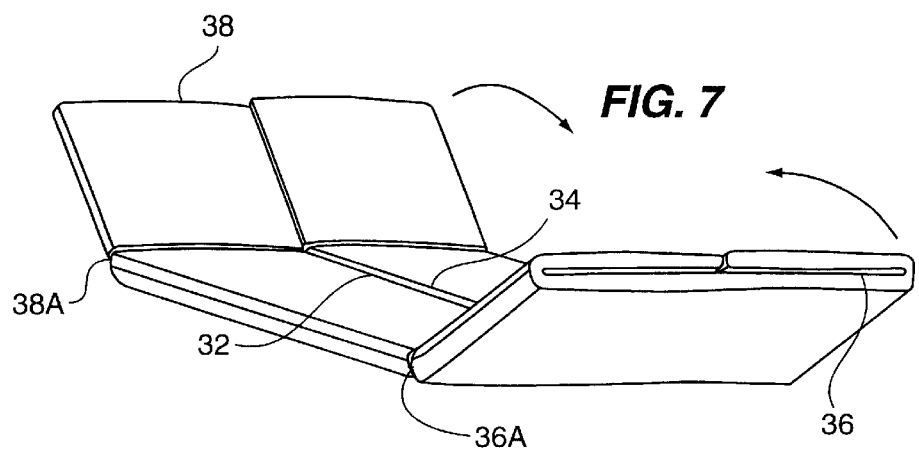
FIG. 7 is a perspective view of the sheet of FIG. 4 following the fold of FIG. 6 and beginning the next fold in sequence.
Figure 8:
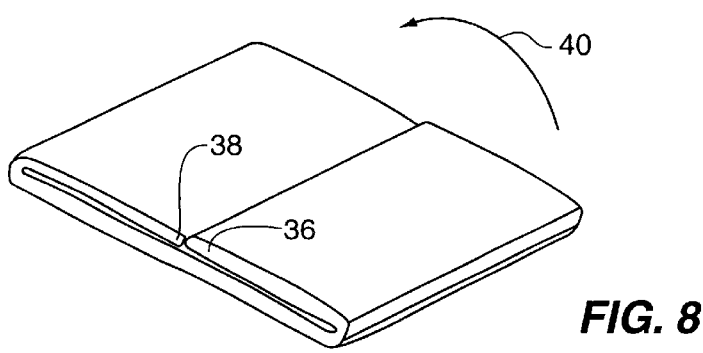
FIG. 8 is a perspective view of the intermediate folded member resulting from completion of the fold of FIG. 7.

Turning now to FIG. 7, second opposing peripheral end edges 36 and 38 are next folded inwardly along crease lines 36a and 38a to place these end free edges near the center, thereby creating the intermediate folded member shown in FIG. 8.

By applying a final finishing fold to this intermediate folded member, such as indicated by the arrow 40, the filler element becomes the rectangular filler element packed 14 shown in FIG. 2.

Clearly, different final shapes of the finished packet can be obtained by varying the finishing fold or folds applied to the intermediate folded member or by reforming the finished packet. As an example, the packet of FIG. 2 may be further formed by a press or mold into a variety of molded shapes, such as the cylindrical shape 50 shown in FIG. 10. Alternatively, the intermediate folded member of FIG. 8 may be formed into a finished packet without the final fold 40, such as by rolling it to form the cylindrical shape 60 shown in FIG. 9.

Finally, structure is provided for securing adjacent end portions 66 and 68 of the packet 50 from separating from each other, such as at least one (if not several) metallic band 72 which is placed around a finished packet to keep it intact. Alternatively, gluing, soldering, welding, brazing or other means known to the art, may also be used for securing the adjacent end portions 66 and 68 in place.

Figure 11:
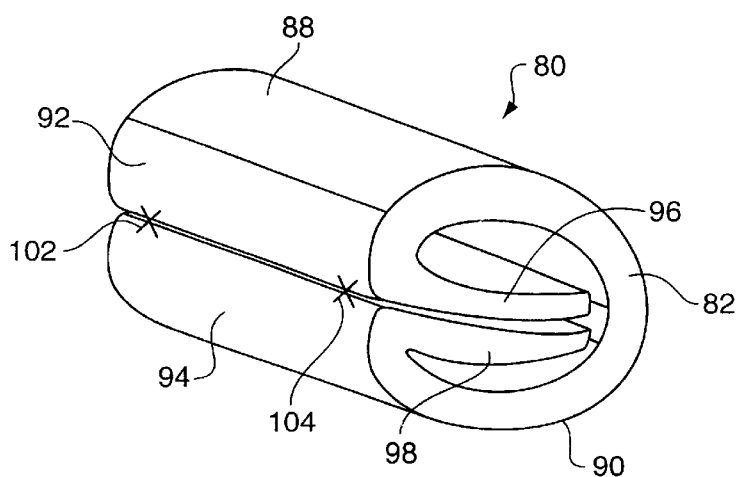
FIG. 11 is a perspective view of still another alternate form of the filler mass element where adjacent exposed ends of folded over portions are welded, soldered or brazed together

In FIG. 11 there is shown a packet 80 similar to the packet 50 shown in FIG. 10. The packet 80 is formed from one or more sheets of foil mesh 82 which are first folded from each side to the center and then folded over again to trap free end edges at the center of the sheet or sheets of foil mesh 82. This provides a top side 88 and a bottom side 90 to the packet and adjacent exposed end portions 92 and 94 of the folded over sheets, whereby the inwardly extending sections 96 and 98 have the free end edges trapped therein within the thus formed packet 80. Then the adjacent exposed end portions 92, 94 of the folded portions of the packet 80 are secured adjacent each other by at least two welds, brazed connections or soldered connections 102 and 104.

Figure 12:
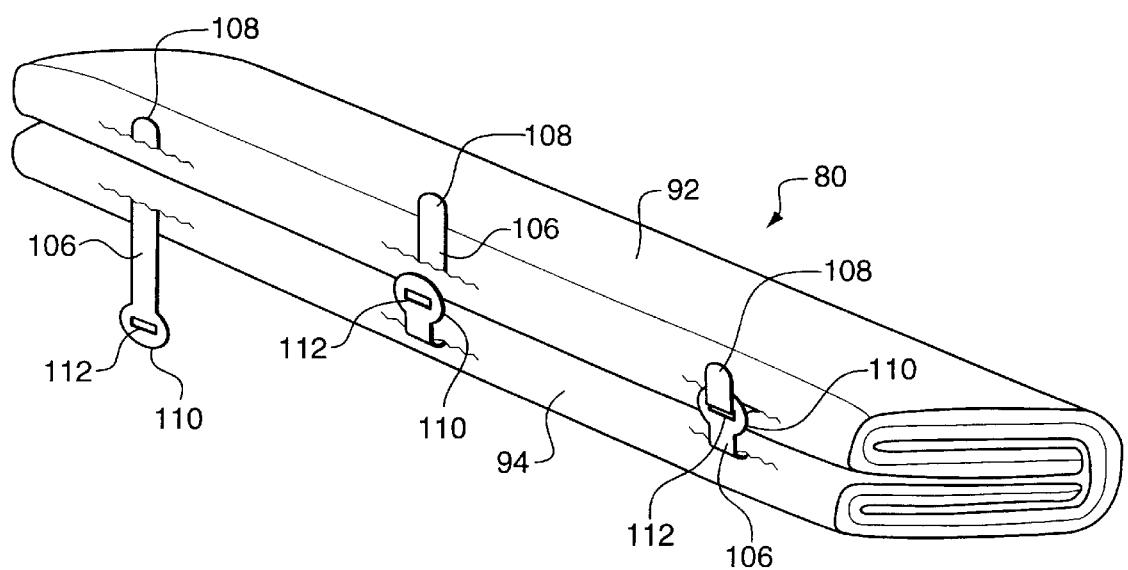
FIG. 12 is a perspective view of still another alternate form of the filler mass element where adjacent exposed ends of folded over portions are held together with clips.

The same packet 80 is shown in FIG. 12 where there is illustrated a different structure for holding the exposed end portions 92 and 94 adjacent each other. Here the exposed end portions 92 and 94 have three metal clips 106 inserted through openings in the exposed layer of mesh of the exposed end portions 92, 94. Each clip 106 is elongate with a rounded end 108 and an enlarged end 110 having a slot 112 therethrough so that the end 108 of the clip 106 can be inserted through the slot. The clip is first inserted through openings in the mesh followed by folding over of the enlarged end 110 to position the slot 112 to receive the end 108 therethrough. The end 108 is then folded over as shown to releasably lock the exposed end portions 92, 94 adjacent to each other.

From the foregoing description, it will be apparent that modifications can be made to the apparatus and method of the present invention for using same without departing from the teachings of the present invention. Accordingly, the scope of the invention is only to be limited as necessitated by the accompanying claims.

I claim:

1. A fuel tank with filler elements therein, comprising:
   a fuel tank;
   a plurality of fuel permeable packets positioned within said fuel tank to provide thermal conduction within said tank,
   wherein each of said packets is formed from at least one sheet of foil mesh, so that at least one sheet of foil mesh is folded over several times whereby the peripheral free edges of said sheet are folded inwardly and disposed internally of each packet, and
   wherein flaking from said free edges of said sheets of foil mesh is contained within said respective packets.

2. The filler insert mass of claim 1 wherein said packet is further formed into a further molded shape.

3. The filler insert mass of claim 1 wherein said packet is formed by folding opposed ends of at least one sheet of foil mesh inwardly to the center of said sheet of foil mesh to form an intermediate folded member and is further formed by rolling said intermediate folded member to form said packet.

4. The filler insert mass of claim 1 further comprising means for securing together adjacent exposed ends of folded over portions of the at least one sheet of foil mesh of each packet.

5. The filler insert mass of claim 4 wherein said securing means comprises one of a weld, a soldered connection or a brazed connection.

6. The filler insert mass of claim 4 wherein said securing means comprises at least one band around said packet.

7. The filler insert mass of claim 4 wherein said securing means comprises at least two clips inserted through openings in said foil mesh on said adjacent exposed ends of folded over portions with ends of each clip being releasably fixed together.

8. The filler insert of claim 1 wherein said free edges of one or more sheets of foil mesh are first folded inwardly to the center of the sheet or sheets followed by folding of said sheet or sheets at the center so that said free edges of said sheet or sheets are trapped within the thus formed packet.

9. A method of manufacturing a tank with explosion suppressing thermal filler mass elements therein comprising the steps of:
   forming sheets of foil mesh; and
   folding said respective sheets of foil mesh several times to form fuel permeable intermediate folded members of filler mass elements having peripheral free edges of said respective sheets disposed inwardly thereof,
   positioning said filler mass elements into a fuel tank,
   wherein said filler mass elements are arranged in thermal contact with said tank to provide thermal conduction within said tank, and
   wherein flaking from said free edges of said sheet of foil mesh is contained within said respective filler mass elements.

10. The method of claim 9 further comprising first forming sections in said mesh, wherein said sections exhibit openings of differing sizes and said sections correspond to folds in said sheet.

11. The method of claim 9 further comprising folding said intermediate folded member.

12. The method of claim 9 further comprising rolling said intermediate folded member.

13. The method of claim 9 wherein said free edges of said sheet of foil mesh are first folded inwardly to the center of said sheet followed by folding of said sheet at the center so that said free edges of said sheet are trapped within the thus formed packet.

14. The method of claim 9 including the step of securing together adjacent exposed end portions of folded over portions of said sheet of foil mesh.

15. The method of claim 14 wherein said step of securing said exposed folded over edges of said sheet of foil mesh is accomplished by one of: welding, brazing, soldering, securing with a band or securing with metal clips.

16. A method of forming a filler mass element for a tank comprising the steps of:
   forming a sheet of foil mesh having sections therein, wherein said sections exhibit openings of differing sizes and said sections correspond to folds in said sheet; and
   folding said sheet of foil mesh several times to form a fuel permeable intermediate folded member of a filler mass element having peripheral free edges of said sheet disposed inwardly of the filler mass element,
   wherein said filler mass element is arranged to provide thermal conduction within said tank, and
   wherein flaking from said free edges of said sheet of foil mesh is contained within said filler mass element.

17. The method of claim 16 further comprising folding said intermediate folded member.

18. The method of claim 16 further comprising rolling said intermediate folded member.

19. The method of claim 16 wherein said free edges of said sheet of foil mesh are first folded inwardly to the center of the sheet followed by folding of said sheet at the center so that said free edges of said sheet is trapped within the thus formed packet.

20. The method of claim 16 including the step of securing together adjacent exposed end portions of folded over portions of said sheet of foil mesh.

21. The method of claim 20 wherein said step of securing said exposed folded over edges of said sheet of foil mesh is accomplished by one of: welding, brazing, soldering, securing with a band or securing with metal clips.

* * * * *